United States Patent

[11] 3,588,662

| [72] | Inventors | Edgar W. Buebel, Jr.<br>Cockeysville, Md.;<br>Ronald J. King, Cambridge, Ohio |
|---|---|---|
| [21] | Appl. No. | 807,226 |
| [22] | Filed | Mar. 14, 1969 |
| [45] | Patented | June 28, 1971 |
| [73] | Assignee | The United States of America as represented by the Secretary of the Navy |

[54] PULSE DISTRIBUTION MODIFIER
3 Claims, 1 Drawing Fig.

[52] U.S. Cl. .................................................. 318/696,
318/603, 318/593
[51] Int. Cl. .................................................. G05b 19/40
[50] Field of Search ............................................. 328/44, 45
(Inquired); 318/138, 254, 20.320, 20.500, 20.310,
20.285

[56] References Cited
UNITED STATES PATENTS

| 3,237,178 | 2/1966 | Valentine | 318/(20,320) |
| 3,238,462 | 3/1966 | Ballard et al. | 328/44 |
| 3,328,658 | 6/1967 | Thompson | 318/138 |
| 3,365,634 | 1/1968 | Centner et al. | 318/(20,320) |
| 3,482,155 | 12/1969 | Fredriksen | 318/(20,320) |

Primary Examiner—G. R. Simmons
Attorneys—Joseph C. Warfield, John W. Pease and Harvey A. David ABSTRACT: A pulse distribution modifier is described which operates to smooth the transition between different pulse repetition rates through the use of an up-down counter which increases by one count for each pulse input and decreases by one count for each pulse output of the modifier. A variable frequency multiplier is responsive to the count in the counter to apply a factor proportional to the count to a high frequency oscillator output to provide a pulse rate which is then divided by another predetermined factor to provide the desired modifier output.

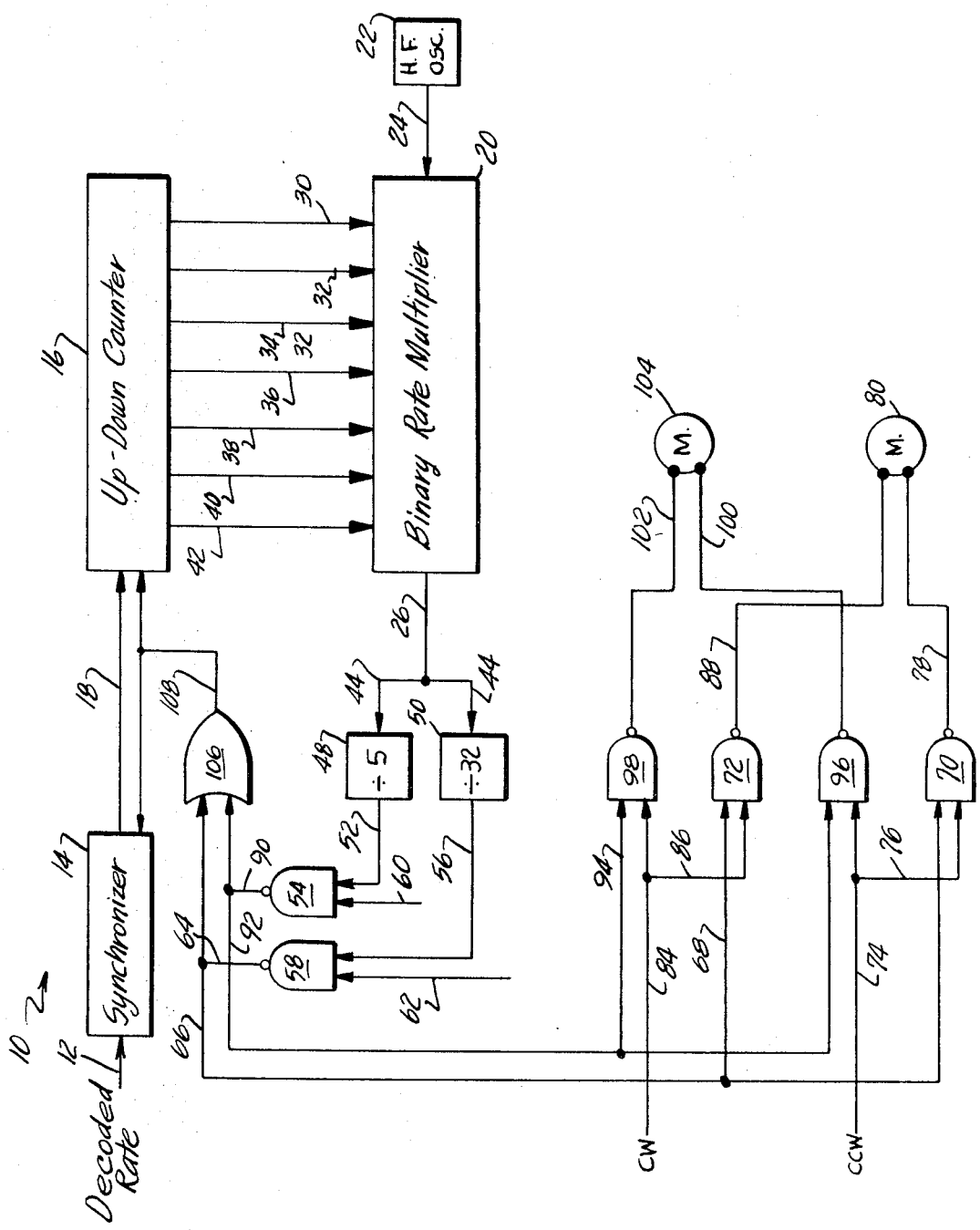

PULSE DISTRIBUTION MODIFIER

BACKGROUND OF THE INVENTION

This invention relates to the use of stepping motor means in drive systems for positioning an element, for example a gimballed mirror in a projection system, in response to a train of electrical pulses so that an image projected by a motion picture projector is caused by the mirror to traverse a projection screen. An example of such a system is described in copending Pat. application Ser. No. 796,693. In that system a train of pulses is decoded from data encoded on the edge of a motion picture film. The data as decoded comprises a pulse train which sometimes has a periodically recurring characteristic which would tend to cause oscillations to develop in the drive system if the pulse train were applied directly as decoded to the stepping motor means. The problem appears to be caused by the fact that as the angular rate increases, it is necessary to change the number of output pulses that are in each word. As an example, the program may call for 1 pulse output per word for 10 words, and then a word with 2 pulses output per word. This addition of a two pulse word every 10 words has the effect of looking like a low frequency modulation of the basic repetition rate to the motor. It has been determined experimentally that the azimuth drive system of the gimballed mirror has a resonant frequency of about 25 Hz. Apparently, as the low frequency modulation passes through the resonant frequency of the gimballed mirror, oscillations are set up accounting for the unsatisfactory mirror motion.

BRIEF SUMMARY OF THE INVENTION

With the foregoing in mind it is a primary object of the present invention to provide a pulse distribution modifier which will modify the train of pulses to reduce periodically recurring characteristics, thereby avoiding the development of oscillations in the utilizing drive system and promoting smooth operation thereof.

Another object of the invention is the provision of a pulse distribution modifier of the foregoing character which further processes the decoded pulse train so that the frequency of pulses cannot change instantaneously, for example, from 1 pulse per word to 2 pulses per word. In effect the modifier integrates the pulse train from the decoding logic such that the frequency cannot change instantaneously from 1 pulse per word to 2 pulses per word with the result that the amplitude of the low frequency component, discussed above, shall be less. The lower amplitude reduces the possibility of oscillation at the gimballed mirror. An additional advantage to the smoothing technique is that the motor no longer will see 1 pulse per word or two pulses per word, but a continuous pulse train that cannot change, in the embodiment to be described, by more than 10 p.p.s. from pulse to pulse in the coarse mode, and no more than 64 p.p.s. in the fine mode.

BRIEF DESCRIPTION OF THE DRAWING

The sole FIG. is a diagrammatic illustration in block form of a pulse distribution modifier embodying the invention.

DESCRIPTION OF THE PREFERRED EMBODIMENT

In the form of the invention illustrated in the drawing and described hereinafter, there is provided a pulse distribution modifier, generally indicated at 10, which receives a train of pulses as an input as shown by flow line 12 to a synchronizer 14, the purpose of which will presently be made apparent. The pulse train input is derived from a recorded program by decoding logic as explained in the aforementioned copending application. The pulse repetition rate may vary considerably from decoded word to decoded word in a somewhat cyclical manner and it is the purpose of the pulse distribution modifier to provide an output which has the same overall number of pulses per program but with relatively smooth, noncyclical changes.

The modifier 10 further comprises an up-down counter 16 which is connected to receive pulses from the synchronizer 14 as shown by line 18. The counter advances one count for each pulse that is decoded and applied to the modifier via line 12.

The count in the counter 16, which is decreased by one for each output pulse of the modifier 10, is utilized to control the output of a binary rate multiplier 20. The multiplier 20 is driven by a high frequency oscillator 22, the output of which is applied as shown by line 24.

The high frequency oscillator and binary rate multiplier generate seven discrete frequencies, each of which is one-half the previous frequency starting with the oscillator frequency which in this example is proportional to 128 Hz. By selecting different combinations of these seven frequencies, it is possible to get from 1/128 of the oscillator frequency to 127/128 of the oscillator frequency in increments of 1/128 of the oscillator frequency at the output 26 of the binary rate multiplier 20. The control of the counter 16 in the selection of one or more of the seven frequencies to be combined in the multiplier 20 is represented by lines 30, 32, 34, 36, 38, 40, and 42.

The output of the multiplier 20 is applied via lines 26, 44, and 46 to a divide by five stage 48 and to a divide by 32 stage 50. The former has its output, shown by line 52, connected as one input to an AND gate 54, while the latter has its output, shown by line 56, connected as one input to an AND gate 58. The other input 60 to gate 54 is a fine mode command derived from the decoding logic of the referenced copending application. Similarly the other input 62 to the gate 58 is a coarse mode command.

Presence of a coarse mode command at line 62 enables the gate 58 to pass the output of the divide by 32 stage 50 to be passed via lines 64 and 66 to be applied as one input to each of AND gates 70 and 72, respectively. The other input to gate 70 via lines 74, 76 is a counterclockwise drive command, the presence of which enables the output of divider stage 50 to be further passed via line 78 to a suitable coarse drive motor 80. Alternatively, the presence of a clockwise command as the other input to gate 72 via lines 84, 86, results in a pulse train output via line 88 to the coarse drive motor 80.

Presence of a fine mode command at line 60 to the gate 54 enables that gate to pass the output of the divide by five stage 48 via lines 90, 92, and 94 as one input to each of AND gates 96 and 98. The AND gates 96 and 98 are respectively connected to receive the counterclockwise and clockwise commands via lines 74 and 76 so as to provide alternative outputs on lines 100 and 102 to a fine drive motor 104.

The pulse train outputs of the gates 54 and 58 are also connected as shown by lines 96 and 66 to an OR gate 106 which passes pulses applied thereto via line 108 to the up-down counter 16. The up-down counter advances one count for each pulse that is decoded by the decoding logic mentioned above and passed via line 18 thereto, and decreases by one count for each pulse that is passed to one of the motors 80, 104. The counter controls the binary rate multiplier 20 in accordance with the count in the counter so that the output of the multiplier can never change at one time by more than 1/128 of the rate of the oscillator 22. The synchronizer 14 operates to prevent the simultaneous application of input or add pulses and output or subtract pulses to the counter 16.

The high frequency oscillator 22 is selected such that the output of the binary rate multiplier is 32 times greater than the rate required by the coarse motor 80. The divide by 32 stage 50 in the described combination thereby provides the desired smoothing and the required rate to the coarse motor.

The divide by five stage 48 does not provide as much smoothing, but less smoothing is necessary in the fine mode of the mentioned mirror drive system since the fine drive motor provides substantially smaller increments of movement to the mirror.

From the foregoing detailed description it will be appreciated that the pulse distribution modifier of this invention accomplishes the previously stated objects and advantages. It will also be appreciated that the invention may be practiced with only a single dividing stage, e.g., the divide by 32 stage 50, when utilized in a system having only a single drive motor rather than coarse and fine motors as described herein.

We claim:

1. In apparatus including stepping motor means and a source of a train of pulses for operation of said stepping motor means, a pulse distribution modifier comprising:
   synchronizer means connected to receive and pass said train of pulses;
   up-down counter means connected to receive said pulses from said synchronizer means and operative to increase the count therein by one for each pulse received;
   a high frequency oscillator for generating, as an output thereof, pulses at a frequency which is a predetermined multiple of the desired rate for said motor means;
   a binary rate multiplier connected to receive said output of said oscillator as an input and operative to multiply said frequency by a variable factor which is determined by said count in said counter to provide, as an output of said multiplier, pulses at a repetition rate which changes by no more than a predetermined fraction of said rate from pulse to pulse thereof; and
   divider means connected to receive the output of said multiplier means and operative to divide the multiplier output by said predetermined multiple to provide a modified pulse train suitable for operating said stepping motor means; and
   said counter means being responsive to the output of said divider means to reduce the count therein by one for each pulse of said modified pulse train.

2. A pulse distribution modifier as defined in claim 1, and further comprising:
   a second divider means connected to receive the output of said multiplier means and operative to divide said multiplier output by a different predetermined multiple; and
   gate means connecting said first mentioned divider means and said second divider means to said counter means, said gate means being operative in response to coarse and fine command signals to render said counter means responsive alternatively to the outputs of said first and second divider means, respectively.

3. A pulse distribution modifier as defined in claim 2, and wherein:
   said stepping motor means comprise a coarse stepping motor and a fine stepping motor, each having alternative input conditions for clockwise and counterclockwise operation; and
   said modifier further comprising additional gate means responsive to clockwise and counterclockwise commands to enable passage of a modifier pulse train output of said first or second divider means to said stepping motor means.